US010290011B2

(12) United States Patent
Manoharan et al.

(10) Patent No.: US 10,290,011 B2
(45) Date of Patent: May 14, 2019

(54) PREDICTING CUSTOMER LIFETIME VALUE

(71) Applicant: TATA CONSULTANCY SERVICES LIMITED, Mumbai (IN)

(72) Inventors: Vignesh Manoharan, Chennai (IN); Parthibarajan Atchayalingam Lakshmikanthan, Chennai (IN); Madhukumar Palani Bommu, Chennai (IN)

(73) Assignee: Tata Consultancy Services Limited, Mumbai, Maharashtra (IN)

( * ) Notice: Subject to any disclaimer, the term of this patent is extended or adjusted under 35 U.S.C. 154(b) by 641 days.

(21) Appl. No.: 14/832,748

(22) Filed: Aug. 21, 2015

(65) Prior Publication Data
US 2016/0247173 A1 Aug. 25, 2016

(30) Foreign Application Priority Data

Feb. 23, 2015 (IN) .......................... 592/MUM/2015

(51) Int. Cl.
G06Q 30/02 (2012.01)
G06Q 10/06 (2012.01)
(52) U.S. Cl.
CPC .............................. *G06Q 30/0202* (2013.01)
(58) Field of Classification Search
CPC .............................. G06Q 10/06; G06Q 30/02
USPC ....................................................... 705/7.31
See application file for complete search history.

(56) References Cited

U.S. PATENT DOCUMENTS

| 2007/0156673 | A1* | 7/2007 | Maga | G06Q 30/02 |
| 2009/0292583 | A1* | 11/2009 | Eilam | G06Q 10/06 |
| | | | | 705/7.31 |
| 2012/0053990 | A1* | 3/2012 | Pereg | G06Q 10/06 |
| | | | | 705/7.31 |
| 2013/0054306 | A1* | 2/2013 | Bhalla | G06Q 30/02 |
| | | | | 705/7.31 |
| 2013/0124258 | A1* | 5/2013 | Jamal | G06Q 30/02 |
| | | | | 705/7.29 |
| 2013/0317886 | A1* | 11/2013 | Kiran | G06Q 30/0202 |
| | | | | 705/7.31 |
| 2015/0032503 | A1* | 1/2015 | Chander | G06Q 30/0201 |
| | | | | 705/7.29 |

(Continued)

*Primary Examiner* — Nga B Nguyen
(74) *Attorney, Agent, or Firm* — Workman Nydegger

(57) ABSTRACT

Method(s) and System(s) for predicting Customer Lifetime Value (CLV) based on segment level churn includes segmenting the customers into multiple segments based on weighted RFM scores associated with data within a dataset. The data is representative of purchasing behavior of customers over a predefined time period. The segmenting is performed such that customers with similar and close weighted RFM scores are placed in one segment. Further, the method includes computing a churn value for each of the customer segments based on the buying behavior of the customers within each segment. The churn value is associated with transaction characteristics associated with customers corresponding to the data in each segment. Expected lifetime period in years for the customers is then predicted from the calculated segment level churn values. Thereafter, CLV, that indicates profitability associated with customers, is predicted for each customer based on their expected lifetime value in years.

12 Claims, 3 Drawing Sheets

(56) References Cited

U.S. PATENT DOCUMENTS

| | | | |
|---|---|---|---|
| 2015/0332296 A1* | 11/2015 | Chu | G06Q 30/0202 705/7.33 |
| 2015/0371163 A1* | 12/2015 | Noh | G06Q 10/0635 705/7.28 |
| 2016/0203509 A1* | 7/2016 | Sharp, III | G06Q 30/0244 705/14.43 |

* cited by examiner

PREDICTING CUSTOMER LIFETIME VALUE

CROSS-REFERENCE TO RELATED APPLICATIONS AND PRIORITY

This patent application claims priority to and the benefit of Indian Patent Application No. 592/MUM/2015, filed on Feb. 23, 2015, the entirety of which is hereby incorporated by reference.

TECHNICAL FIELD

The present subject matter relates, in general, to predicting Customer Lifetime Value (CLV) in retail and, in particular, to predicting CLV based on a segment level churn.

BACKGROUND

Customer Lifetime Value (CLV), in general, refers to an estimation of an overall value that an organization may derive from customers during their association with the organization. The overall value may be in terms of overall profitability or revenue generated by the association of the customers with the organization. The estimation of the CLV is generally based on an expected lifetime period for which a customer stays associated with the organization and makes transaction for services, goods or products associated with the organization.

The expected lifetime period is generally estimated based on certain parameters that are associated with a customer's present and past purchasing behavior. The parameters can include frequency of purchase, propensity to make purchase, purchase recency and quantum of purchase during a predefined time period. All such parameters allow the organization to predict CLV in terms of overall profitability or revenue.

The CLV can also be separately estimated for different classes of customers, such as, based on demographics, age, expected lifetime in years and income of the customers. Such class based estimation enables the organization to determine strategies that are customized according to the requirements and behavior of a particular class of customers and thus improves profitability of the organization. The CLV also enables an organization to streamline separate business strategies for separate classes of customers to maximize overall profitability. Accordingly, the organization may provide targeted promotions to customers to improve their CLV.

BRIEF DESCRIPTION OF THE DRAWINGS

The detailed description is described with reference to the accompanying figure(s). In the figure(s), the left-most digit(s) of a reference number identifies the figure in which the reference number first appears. The same numbers are used throughout the figure(s) to reference like features and components. Some implementations of systems and/or methods in accordance with implementations of the present subject matter are now described, by way of example only, and with reference to the accompanying figure(s), in which.

Figure 1:
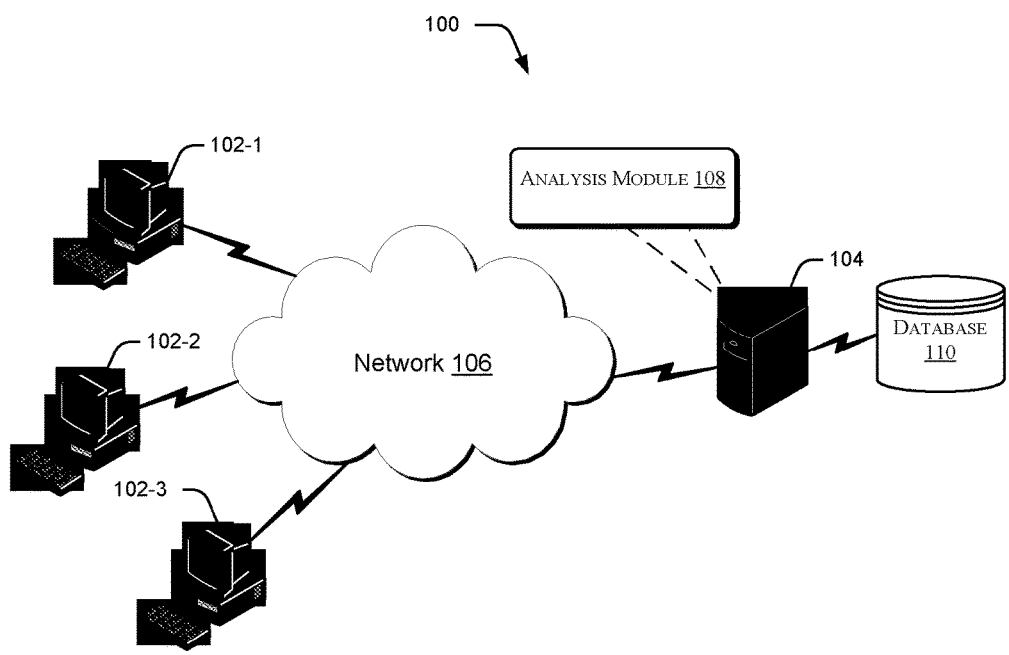
FIG. 1 illustrates a computing environment, implementing a Data Analysis System (DAS), according to an implementation of the present subject matter.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

DETAILED DESCRIPTION

System(s) and Method(s) for predicting CLV based on segment level churn are described. Conventionally, various techniques for predicting Customer Lifetime Value (CLV) have been developed, that predict the CLV based on one or more parameters. Generally, such parameters correspond to margin, retention, discount rate, acquisition cost and referral values from customers. The known techniques either collect or estimate the values of such parameters from various sources, perform calculations to obtain resultant values and utilize the resultant values to predict the CLV.

Such techniques rely on accuracy and legitimacy of the parameters for predicting the CLV and therefore any discrepancy in the value of any parameter may result in an inaccurate prediction. However, for certain parameters such as, referral values, proven methods to compute such parameters may not be available. Further, for parameters, such as, acquisition cost, there are no defined method to confirm whether a customer is acquired. Such known techniques may therefore estimate inaccurate parameter values thereby resulting in an inaccurate prediction of the CLV.

Some known techniques leverage an ecommerce approach that considers average revenue, margin and churn of the customers. The techniques utilizing the ecommerce approach does not take into account the lifetime period of the customer and the discount rate for calculating discounted cash flow thereby resulting in inaccurate prediction of CLV.

The known techniques for predicting the CLV usually have lower accuracy of predicting the CLV as the techniques consider fewer number of parameters and do not analyze a large volume of data. Further, the techniques are not applicable to wide range of customers with different buying behaviors ranging from habitual buyers to complex buyers. Therefore, application of a common technique to wide range of customers for calculating CLV results in an inappropriate prediction. Additionally, the current techniques are not efficient in handling the large volume of data including several parameters for computation of CLV.

In accordance with an example implementation of the present subject matter, system(s) and method(s) for predicting CLV based on segment level churn are described. The described technique of predicting CLV ensures a higher degree of accuracy in the prediction of CLV as the prediction is based on assessment of multiple parameters and an analysis of large volume of data related to the customers. Additionally, the described technique perform data analysis of the large volume of data to gather information about customer's buying behavior and expected lifetime.

In an implementation of the present subject matter, the Data Analysis System (DAS) may predict CLV using a segment level churn. In operation, to compute CLV, the DAS may receive datasets including data representative of purchasing behavior of customers over a predefined time period. In an implementation, the data may be obtained by multiplication of total number of parameters with the customer base. The DAS may then segment the customers into multiple segments based on weighted scores. The DAS may segment the customers into clusters based on the weighted score derived from their transaction data in such a manner that customers within a cluster will have very close weighted scores and across clusters the weighted scores will have huge difference. For example, customers with weighted scores in the range of 15-18 may be kept in one segment, whereas customers having 22-25 as their weighted score range will be part of another segment.

Thereafter, the DAS may compute a churn value for each segment based on the buying behavior of the customers in that segment. Here, the churn value may be associated with transaction characteristics associated with customers corresponding to data in each segment. The transaction characteristics can be understood as purchasing behavior of the customers such as frequency, recency and amount of transactions with an organization. After computing the churn value, the DAS may predict the CLV for each segment based on the churn value.

Techniques of the present subject matter provide enhanced prediction of CLV by computing churn value for each segment and determining segment level expected lifetime in years. Further, the described techniques facilitate in predicting CLVs that are customized based on the expected lifetime in years of the customers. The CLV so predicted is based on large number of parameters that includes analysis of a large volume of data. Therefore, the prediction is accurate. Furthermore, the described technique allows for efficient handling of large volume of data for predicting the CLV.

It should be noted that the description merely illustrates the principles of the present subject matter. It will thus be appreciated that those skilled in the art will be able to devise various arrangements that, although not explicitly described herein, embody the principles of the present subject matter and are included within its spirit and scope. Furthermore, all examples recited herein are principally intended expressly to be only for explanatory purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and implementations of the invention, as well as specific examples thereof, are intended to encompass equivalents thereof It will also be appreciated by those skilled in the art that the words during, while, and when as used herein are not exact terms that mean an action takes place instantly upon an initiating action but that there may be some small but reasonable delay, such as a propagation delay, between the initial action and the reaction that is initiated by the initial action. Additionally, the words "connected" and "coupled" are used throughout for clarity of the description and can include either a direct connection or an indirect connection. Thus, if a first device couples to a second device, that connection may be through a direct electrical or mechanical connection, through an indirect electrical or mechanical connection via other devices and connections, through an optical electrical connection, or through a wireless electrical connection. Various implementations of the present subject matter have been described below by referring to several examples.

The above mentioned methods and systems are further described with reference to FIG. 1 to FIG. 3. It should be noted that the description and figures merely illustrate the principles of the present subject matter along with examples described herein and, should not be construed as a limitation to the present subject matter. It is thus understood that various arrangements may be devised that, although not explicitly described or shown herein, embody the principles of the present subject matter. Moreover, all statements herein reciting principles, aspects, and specific examples thereof, are intended to encompass equivalents thereof.

FIG. 1 illustrates an environment 100 according to an implementation of the present subject matter. The environment 100 may either be a public distributed environment or may be a private closed network environment. The environment 100 may include different retailer data systems 102-1, 102-2, . . . , 102-N, communicatively coupled to a Data Analysis System (DAS) 104 through a network 106. The DAS 104 may include an analysis module 108 for analyzing the large volume of data related to the customers. Further, the environment 100 may include the DAS 104 communicatively coupled to a database 110. For the sake of explanation, the retailer data systems 102-1, 102-2, . . . , 102-N, have been commonly referred to as retailer data systems 102, and have been individually referred to as retailer data system 102, hereinafter.

In an implementation of the present subject matter,the retailer data system 102 may be one of a server, or a data base through which a retailer may collect data corresponding to transactions conducted by customers. In another implementation, the retailer data system 102 may be one of a POS system located at shopping malls and retail shops from where customers purchase items for different organizations from time to time. In an implementation, the DAS 104 may be a centrally located unit for collecting transaction related data from retailers and process the data to gather meaningful information. In another implementation, the DAS may be a data analyzing system located within each organization to perform data analysis for respective organizations.

The network 106 may be a wireless or a wired network, or a combination thereof The network 106 can be a collection of individual networks, interconnected with each other and functioning as a single large network (e.g., the internet or an intranet). Examples of such individual networks include, but are not limited to, Global System for Mobile Communication (GSM) network, Universal Mobile Telecommunications System (UMTS) network, Personal Communications Service (PCS) network, Time Division Multiple Access (TDMA) network, Code Division Multiple Access (CDMA) network, Next Generation Network (NGN), Public Switched Telephone Network (PSTN), and Integrated Services Digital Network (ISDN). Depending on the technology, the network 106 includes various network entities, such as transceivers, gateways, and routers; however, such details have been omitted for ease of understanding.

Among other capabilities, the database 110 may serve as an external repository for storing information about predicted CLV for the customers. The database 110 may be one of a storage unit to store information provided by the DAS 104. In an implementation, the database may be HBase to store large volumes of data. In an example implementation, the database 110 may be an internal repository within the DAS 104 for storing the information about predicted CLV for the customers.

In an implementation of the present subject matter, Retailers collate data regarding transactions of services, goods or products conducted by the customers for a pre-defined time period. Thereafter, the retailers share the data with the DAS 104 through the network 106. In another implementation, the DAS 104 may collect the data for a predefined time period from various retailer data systems 102 through the network 106 and process the data to predict the CLV. In an implementation, the retailer data systems can be understood as nodes at retailer sites that store the data and from where the DAS 104 can collect the data through the network 106. For instance, the DAS 104 may collect the data regarding transactions related to purchase of clothing accessories from retailers for a period of three years. In an implementation, the DAS 104 may collect the data from one or more distributed networks to which different data systems across different locations are connected. In an example implementation, the DAS 104 may collect the data periodically from the retailers after lapse of a predefined time period of, for instance, 6 months.

In an implementation, the DAS 104 may collect the data and create a customer base to store the data corresponding to the customers and their transactions. The DAS 104 may then perform data analysis on the data to determine purchasing behavior of the customers. In an implementation the DAS 104 may utilize the analysis module 108 to perform analysis on the collected data. In an implementation, the analysis module 108 may perform one of trend analysis and pattern analysis on the collected data to determine the purchasing behavior of the customers.

After performing data analysis, the DAS 104 may predict expected lifetime of the customers based on their purchasing behavior. The expected lifetime may indicate a time period for which the customers may be associated with the retailer. The time period may be predicted based on a churn value associated with the customers. Here, the churn value may be indicative of different parameters or attributes related to purchase patterns that determine a customer's association with a retailer. These parameters or attributes may include, but not limited to, frequency of transactions, recency, propensity to make a purchase and value of transaction. Accordingly, the DAS 104 may estimate the profitability associated with the customers for the time period in terms of CLV. The DAS 104 may then store the CLV in the database 110 for later use. In an implementation, the CLV stored in the database 110 may be later used by the DAS 104 to provide promotional offers and discounts to the customers in order to retain an identified, valuable strata of customers. The explanation regarding functioning of the DAS 104 and computation of CLV has been further explained in detail with respect to the description of forthcoming figures.

Figure 2:
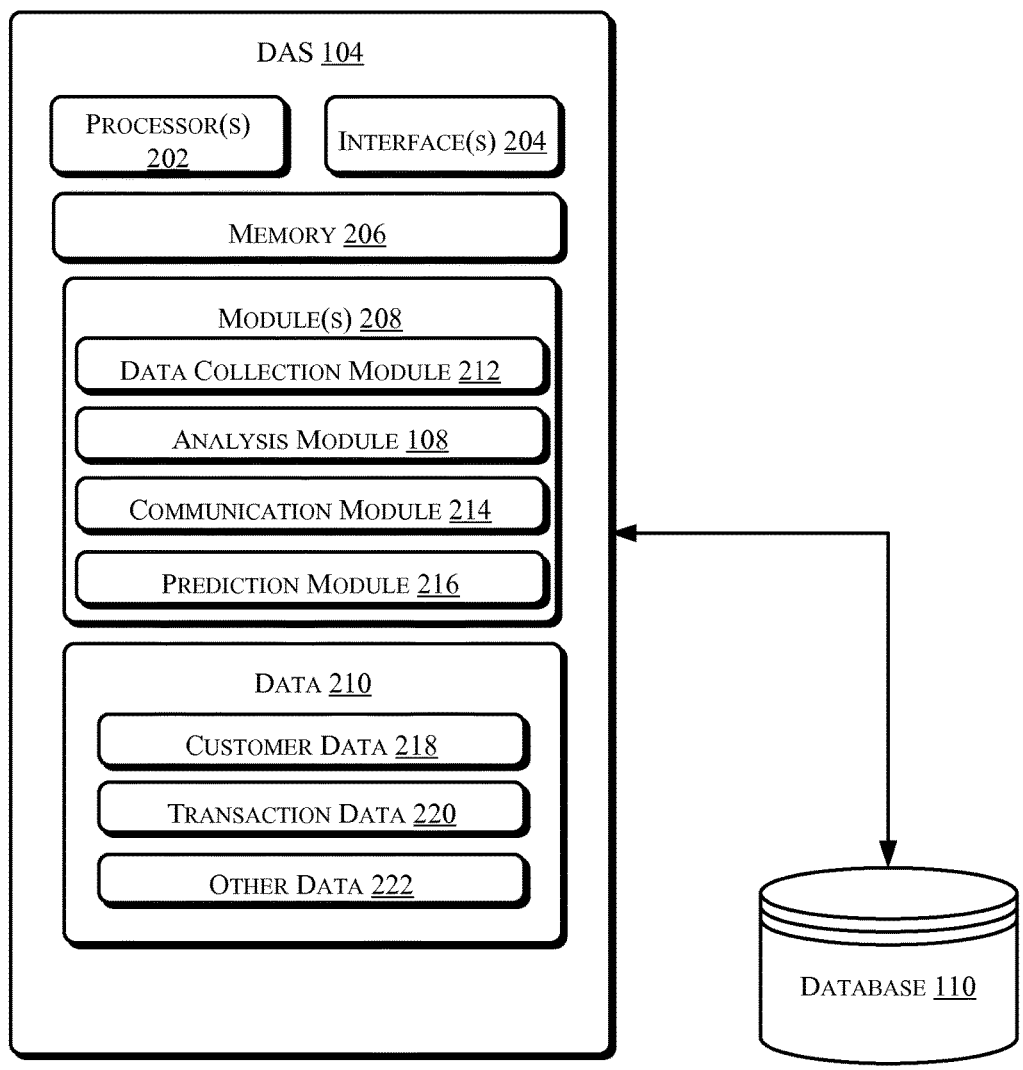
FIG. 2 illustrates components of the DAS, in accordance with an implementation of the present subject matter.

FIG. 2 illustrates components of the DAS 104, in accordance with an implementation of the present subject matter. The DAS 104 may include a processor(s) 202, an interface(s) 204, and a memory 206. Further, the DAS 104 may include module(s) 208 and data 210.

The processor 202, amongst other capabilities, may be configured to fetch and execute computer-readable instructions stored in the memory 206. The processor 202 may be implemented as one or more microprocessors, microcomputers, microcontrollers, digital signal processors, central processing units, state machines, logic circuitries, and/or any devices that manipulate signals based on operational instructions. The functions of the various elements shown in the figure, including any functional blocks labeled as "processor(s)", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), non-volatile storage. Other hardware, conventional and/or custom, may also be included.

The interface(s) 204 may include a variety of machine readable instructions-based interfaces and hardware interfaces that allow the DAS 104 to interact with different entities, such as the processor 202, the module 208, and the data 210. Further, the interface(s) 204 may enable the components of the DAS 104 to communicate with other DAS, and external repositories. The interface 204 may facilitate multiple communications within a wide variety of networks and protocol types, including wireless networks, wireless Local Area Network (WLAN), RAN, satellite-based network, etc.

The memory 206 may be coupled to the processor 202 and may, among other capabilities, provide data and instructions for generating different requests. The memory 206 can include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

The module(s) 208 may include routines, programs, objects, components, data structures, and the like, which perform particular tasks or implement particular abstract data types. The module(s) 208 may further include modules that supplement applications on the DAS, for example, modules of an operating system. Further, the module 208 can be implemented in hardware, instructions executed by a processing unit, or by a combination thereof.

In another aspect of the present subject matter, the module(s) 208 may be machine-readable instructions (software) which, when executed by a processor/processing unit, perform any of the described functionalities. The machine-readable instructions may be stored on an electronic memory device, hard disk, optical disk or other machine-readable storage medium or non-transitory medium. In one implementation, the machine-readable instructions can be also be downloaded to the storage medium via a network connection.

The data 210 serves, amongst other things, as a repository for storing data that may be fetched, processed, received, or generated by one or more of the module(s) 210.

The module(s) 208 may perform different functionalities which may include, but may not be limited to, collecting information from multiple retailer data systems 102 to create a dataset, analysing the dataset to determine purchasing behaviour of customers, and predicting CLV. Accordingly, the module(s) 208 may include a data collection module 212 for collecting information from the retailer data systems, an analysis module 108 for analyzing the collected information and a communication module 214 for communicating with the retailer data systems 102 and other DAS. Further, the module(s) 210 may include prediction module(s) 216 for predicting customer lifetime in years for the customers for performing additional operations, such as, but may not be limited to, selecting optimum technique for predicting the CLV and determining a threshold value for expected lifetime of customers. The data 210 may include customer data 218, transaction data 220 and other data 222 which includes margin data and derived data like recency, frequency and monetary values.

In operation, the data collection module 212 of the DAS 104 may collect the data related to transactions conducted by customers within the predefined time period. The data may be collected from retailer data systems 102 corresponding to different regions distributed across different locations. The data can be understood as information associated with different transactions that customers have conducted within the predefined time period. For example, the data may be related to number of transactions conducted by customers, amount involved in the transactions and category of product purchased by the customers. In an implementation of the present subject matter, the data collection module 212 may collect the data from individual Point Of Sale (POS) terminals distributed across different locations within different retail stores or a centralized POS system that stores the data for multiple POS terminals.

After collecting the data, the data collection module 212 may collate the data to obtain a structured format for the collected data. The data may be collated based on several factors or combination of factors such as, but not limited to, product category, amount involved in the transactions and frequency of transactions in a month. The data collection module 212 may collate the data in order to simplify the process of data analysis performed later on the collated data. Thereafter, the data is stored as a dataset for storing the transaction data 220. In an implementation of the present subject matter, the dataset of transaction data 220 may be stored in relation with the customer data 218. In an example implementation, the dataset is obtained based on a product of total number of parameters, such as, frequency, amount, profit, of the transactions and the customer data 218. In another example implementation, the dataset may be Big data that provides flexibility and scalability in performing data analysis on a large dataset.

In an implementation of the present subject matter, the analysis module 108 may analyze the dataset to determine the segment level churn value based on the purchasing behavior of the customers within the segment. In an example implementation, the analysis module 108 may analyze the data leveraging the distributive processing capability of MapReduce to implement the underlying logic. The MapReduce Implementation can be understood as a means for performing parallel and distributed processing of a large volume of data distributed across several computing nodes or servers. In analyzing the dataset, the analysis module 108 may apply data cleansing on the dataset to eliminate incomplete and corrupted data from the dataset. Further, the data cleansing operation may eliminate redundant data from the dataset. In an implementation, the analysis module 108 may apply data normalizing techniques to eliminate redundant and corrupted data from the dataset.

After applying data cleansing, the analysis module 108 may perform a weighted Recency Frequency and Margin (RFM) analysis on the dataset. The weighted RFM analysis may be performed to analyze the data stored in the dataset based on parameters such as, recency of transactions, frequency of transactions and margin of the transactions conducted by the customers. The weighted RFM analysis can be understood as an analysis where data corresponding to transactions are analyzed based on the parameters and then assigned a weightage. For example, data corresponding to transactions is analyzed to determine recency of the data corresponding to a transaction. Accordingly, a specific score may be assigned to the data. The data is assigned higher value if the transaction is most recent and lower value if the data is less recent.

For instance, if the transaction was conducted by a customer a week ago then the data is assigned a score of 5. Similarly, if the transaction was conducted a year back, then a score of 3 may be assigned to the data. In a similar manner, the data may be analyzed for frequency of the data for the transaction or similar transactions over the predefined time period. In an example implementation, the predefined time period may be 36 months or 3 years that may be defined by the organization. A higher score is assigned when the data corresponding to the transaction has high frequency. For margin analysis, the data may be analyzed for profit margin obtained by the corresponding transaction and accordingly assigned a score. For instance, the data with a higher profit margin is assigned a higher score. This assignment of scores corresponding to recency, frequency and monetary values is dependent on the total timeframe or period for which the transaction data is considered.

In an implementation of the present subject matter, the analysis module 108 may perform the weighted RFM analysis on the dataset and assign weights to each parameter. Thereafter, weight corresponding to each parameter is multiplied with respective scores corresponding to each parameter to obtain weighted RFM scores for each and every customer. The weights can be understood as a score that is assigned based on predefined weights associated with each parameter. For example, the recency may have a weight of 7, frequency a weight of 2 and margin a weight of 1. For every customer, based on the customer's transaction data, values are derived for Recency, frequency and margin parameters. Scores are then assigned in the range of 1 to 5 corresponding to each of the parameters based on the quintile in which the determined value falls. In an implementation, the weighted RFM score is assigned to customer by computing a product of normal scores of the parameters with their corresponding weights.

The analysis module 108 may then segment the customers into multiple segments based on the weighted RFM scores. The segmenting is performed in a manner that customers with close or similar weighted RFM scores are retained in a common segment, whereas customers with different weighted RFM scores are retained in separate segments. Since, the data in each segment corresponds to transactions conducted by customers, the segment of the data can be understood as a segment of customers. After segmenting the customers, a churn value is estimated for each segment. The churn value can be understood as a probability that a customer may not be in association with the organization. The churn value may be determined by the data stored in the dataset, such as, declining an offer, a long time gap between two transactions, for instance 4-6 months, decreasing propensity to make a purchase and preferring other products from another organization.

In an example implementation, the churn value may be determined based on purchasing behavior in first, second and third year of the predefined time period, for instance, a three year period to determine a trend of purchase. In another example implementation, the churn value may be determined based on exponential moving average computation by assigning more weightage to a churn trend in the recent year considered than the remaining years. The churn trend in the recent year is assigned more weight as the most recent trend is more likely to be repeated in the future or the future trend to a maximum extent depends on the most recent past trend The churn value may also be determined in such a manner that the churn value for the fourth year proves to be more similar to churn value of the third year. Thereafter, the analysis module 108 determines the expected lifetime in years of customers based on the churn value. The expected lifetime in years is estimated for each segment based on their respective churn values.

The expected lifetime may then be compared with a predefined time period based on the industry standards. For instance, the predefined time period may be 5 years as defined by the organization. Based on the comparison, the analysis module 108 may determine the segments that includes customers who have expected life time greater than the predetermined threshold and segments of customers who have expected lifetime lower that the predetermined threshold. The analysis module 108 may then share the results with the prediction module 216.

In an implementation of the present subject matter, the prediction module 216 may predict the CLV for each customer of each segment based on whether a customer has an expected lifetime greater than the predetermined threshold. If the expected lifetime in years is lesser than the threshold then a first computation technique leveraging predicted lifetime in years is utilized. For the first computation technique, calculated margin value, interest rate for discounted cash flow is used to predict the CLV. For customers with expected lifetime in years greater than the predetermined threshold a second computation technique leveraging calculated margin, retention rate and interest rate for discounted cash flow is used for predicting the CLV. For the second computation technique, the expected customer lifetime in years is considered to be infinity.

In an implementation, the prediction module 216 may predict the CLV and store the CLV in the database 110. In another implementation, the CLV stored in database 110 may be later used by DAS 104 for the purpose of providing promotional offers to the customers in order to retain the high value customers. In an example implementation, the database 110 may be a hbase for storing the CLV for the customers.

Figure 3:
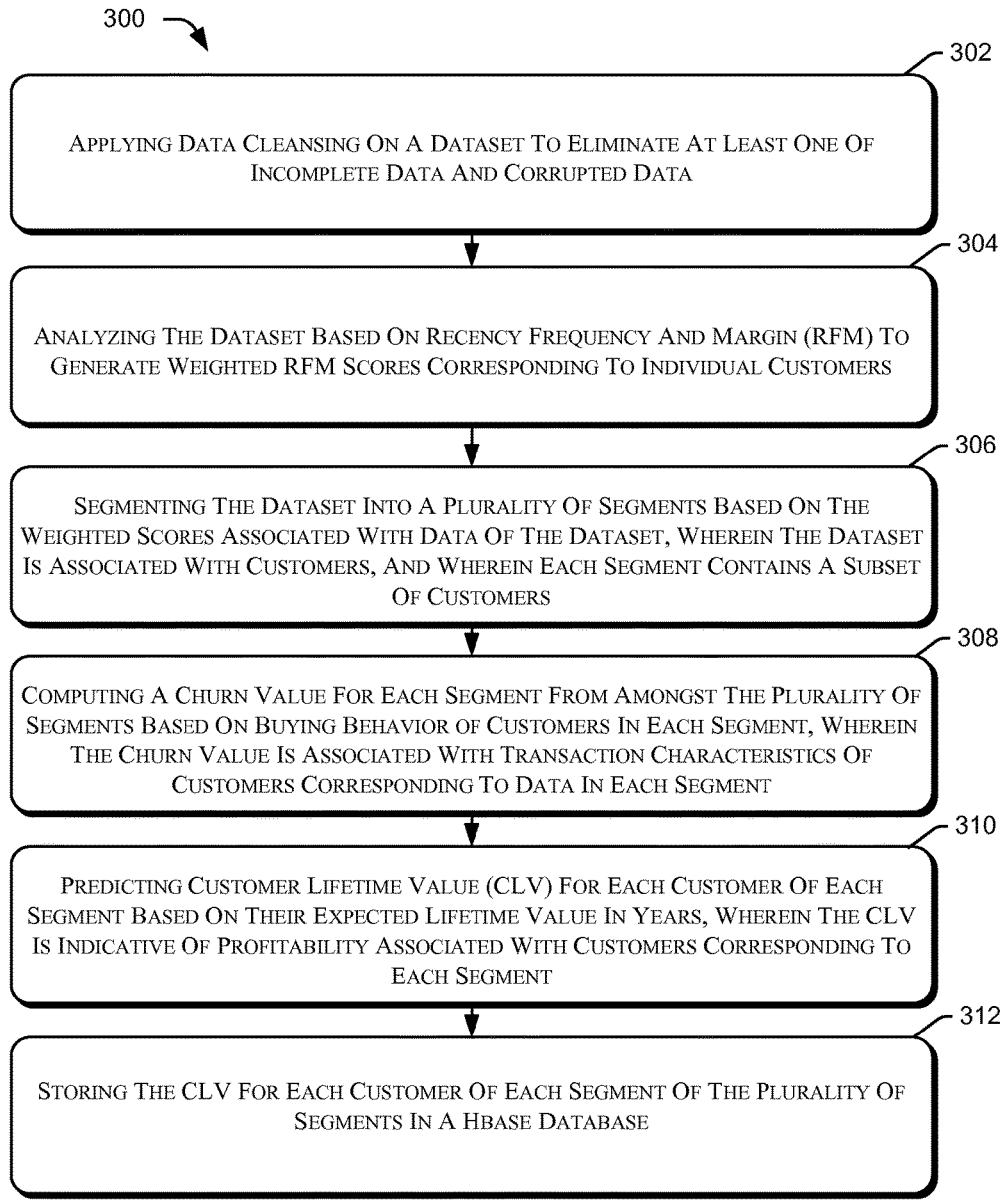
FIG. 3 illustrates a method for predicting Customer Lifetime Value based on segment level churn, according to an implementation of the present subject matter.

FIG. 3 illustrates method 300 for predicting the CLV based on segment level churn. The order in which the method 300 is described is not intended to be construed as a limitation, and any number of the described method blocks may be combined in any order to implement the method 300 or an alternative method. Furthermore, the method 300 may be implemented by processor(s) or computing system(s) through any suitable hardware, non-transitory machine readable instructions, or combination thereof.

It may be understood that steps of the method 300 may be performed by programmed computing systems. The steps of the method 300 may be executed based on instructions stored in a non-transitory computer readable medium, as will be readily understood. The non-transitory computer readable medium may include, for example, digital memories, magnetic storage media, such as one or more magnetic disks and magnetic tapes, hard drives, or optically readable digital data storage media. In an implementation of the present subject matter, the method 300 may be executed by the DAS 104, as described earlier.

At block 302, a data cleansing operation is performed on a dataset to eliminate incomplete and corrupted data. The data cleansing may also be applied to eliminate redundant data from the dataset. In an example implementation of the present subject matter, the data cleansing is performed by the analysis module 108.

At block 304, the dataset is analyzed based on recency frequency and margin (RFM) parameters to generate weighted scores. In an implementation, the weighted scores may be generated by the analysis module 108. In an example implementation, the weighted scores are generated based on predefined weights assigned to each of recency, frequency and parameters where recency has a weight of 7, frequency has a weightage of 2 and profit margin has a weightage of 1.

At block 306, the dataset is segmented into a plurality of segments based on weighted RFM scores. In an implementation, the dataset is associated with customers and therefore it will be understood that by segmenting the dataset, the customers associated with the dataset may be segmented into the plurality of segments with each segment having a subset of plurality of customers. The customers are segmented in such a manner that those customers with similar or very close weighted RFM scores may be grouped into the same segment. In an implementation, the segmenting is performed by the analysis module 108.

At block 308, a churn value is computed for each segment of customers based on their buying behavior. The churn value so computed may be associated with transaction characteristics of customers corresponding to data in each segment. In an implementation, the churn value is computed by the analysis module 108.

Thereafter, at block 310, CLV values are predicted for each customer of each segment based on their expected lifetime in years. In an implementation of the present subject matter, the prediction module 216 may predict the CLV values of individual customers.

At block 312, the CLV values for each customer of each segment may then be stored in a database. The stored CLV values may then be used by an organization to determine deals and offers for different customers. In an implementation of the present subject matter, the CLV values may be stored in database 110.

Although implementations of present subject matter have been described in language specific to structural features and/or methods, it is to be understood that the present subject matter is not necessarily limited to the specific features or methods described. Rather, the specific features and methods are disclosed and explained in the context of a few example implementations for projection systems.

We claim:

1. A method for predicting Customer Lifetime Value (CLV), the method comprising:
    segmenting, by a hardware processor, a dataset into a plurality of segments based on weighted Recency Frequency and Margin (RFM) scores, wherein the dataset includes data representative of purchasing behavior of customers over a predefined time period, wherein the weighted RFM scores are associated with the data of the dataset, and wherein the data corresponding to the customers with similar weighted RFM scores is placed in one segment and data corresponding to the customers with dissimilar weighted RFM score is placed in individual segments;
    computing, by the hardware processor, a churn value for one or more segments from amongst the plurality of segments based on the buying behavior of customers within each of the plurality of segments, wherein the churn value is associated with transaction characteristics associated with the customers corresponding to the data in each segment; and
    predicting, by the hardware processor, a CLV for a customer of each segment based on an expected lifetime period of the customer, wherein predicting the CLV comprises:

computing expected lifetime period for the customer of a segment based on the churn value, wherein the expected lifetime period corresponds to a time period for which the customer is expected to perform transactions with an organization;

performing a comparison of the expected lifetime period with a threshold and determine the one or more segments that include customers with the expected lifetime period greater than the threshold and the one or more segments that include customers with the expected lifetime period lesser than the threshold; and estimating the CLV for each customer of each segment based on whether the customer has the expected lifetime period greater than the threshold, wherein for the customer with the expected lifetime period lesser than the threshold, a first computation technique leveraging a calculated margin value, an interest rate for discounted cash flow is used to predict the CLV, wherein for the customer with the expected lifetime period greater than the threshold, a second computation technique leveraging a calculated margin, a retention rate and an interest rate for discounted cash flow is used to predict the CLV, wherein the CLV is indicative of association of the customers with the organization corresponding to each segment.

2. The method as claimed in claim 1 further comprising storing the CLV value for each customer of each segment in a Hbase database.

3. The method as claimed as claim 1, wherein the weighted RFM scores are computed by performing data analysis on the dataset based on Recency Frequency and Margin (RFM) parameters associated with the data corresponding to the customers.

4. The method as claimed in claim 3, wherein the data analysis comprises:
applying data cleansing on the dataset to eliminate at least one of incomplete data and corrupted data; and
analyzing the dataset based on Recency Frequency and Margin (RFM) to generate the weighted RFM scores.

5. The method as claimed in claim 1, wherein the data set is segmented by utilizing distributive processing capability of MapReduce technique.

6. The method as claimed in claim 1, wherein the churn value is computed based on an exponential moving average technique by assigning more weightage to a churn trend in a recent year than the remaining years of the predefined time period.

7. A Data Analysis System (DAS) communicatively coupled to a database and a retailer data system for predicting Customer Lifetime Value, the DAS comprising:
a hardware processor;
a data collection module coupled to the hardware processor, wherein the data collection module is configured to collect data related to transactions conducted by customers from the retailer data system through a network and collate the data to obtain a structured format for the collected data;
an analysis module coupled to the hardware processor, wherein the analysis module is configured to:
segment the dataset into a plurality of segments based on weighted Recency Frequency and Margin (RFM) scores, wherein the dataset includes data representative of purchasing behavior of customers over a predefined time period, wherein the weighted RFM scores are associated with the data of the dataset, and wherein the data corresponding to the customers with similar weighted scores is placed in one segment and data corresponding to the customers with dissimilar weighted RFM score is placed in individual segments; and
compute a churn value for one or more segments from amongst the plurality of segments based on the buying behavior of the customers within each segment, wherein the churn value is associated with transaction characteristics associated with the customers corresponding to the data in each segment; and
a prediction module coupled to the hardware processor, wherein the prediction module is configured to predict a CLV for each segment based on an expected lifetime in years of each customer, wherein the prediction module is further configured to:
compute an expected lifetime period for the customer of a segment based on the churn value, wherein the expected lifetime period corresponds to a time period for which the customer is expected to perform transactions with the organization;
perform a comparison of the expected lifetime period with a threshold and determine the one or more segments that include customers with the expected lifetime period greater than the threshold and the one or more segments that include customers with the expected lifetime period lesser than the threshold; and
estimate the CLV for each customer of each segment based on whether the customer has the expected lifetime period greater than the threshold,
wherein for the customer with the expected lifetime period lesser than the threshold, a first computation technique leveraging a calculated margin value, an interest rate for discounted cash flow is used to predict the CLV,
wherein for the customer with the expected lifetime period greater than the threshold, a second computation technique leveraging a calculated margin, a retention rate and an interest rate for discounted cash flow is used to predict the CLV,
wherein the CLV is indicative of association of the customers with the organization corresponding to each segment.

8. The DAS as claimed in claim 7, further to store the CLV value for each of the customers in a Hbase database.

9. The DAS as claimed in claim 7, wherein the analysis module is further configured to:
apply data cleansing on the dataset to eliminate at least one of incomplete data and corrupted data; and
analyze the dataset based on Recency Frequency and Margin (RFM) to generate the weighted RFM scores.

10. The DAS as claimed in claim 7, wherein the analysis module is further configured to:
segment the dataset into the plurality of segments by utilizing MapReduce technique; and
compute the churn value based on an exponential moving average technique by assigning more weightage to a churn trend in a recent year than the remaining years of the predefined time period.

11. A non-transitory computer-readable medium comprising instructions for predicting Customer Lifetime Value (CLV) executable by a hardware processor resource to:
segment the customers into a plurality of segments based on weighted Recency Frequency and Margin (RFM)

scores, wherein the dataset includes data representative of purchasing behavior of customers over a predefined time period, wherein the weighted RFM scores are associated with the data of the dataset, and wherein the data corresponding to the customers with similar weighted RFM scores is placed in one segment and data corresponding to the customers with dissimilar weighted RFM score is placed in individual segments;

compute a churn value for one or more segments from amongst the plurality of segments based on the buying behavior of the customers within each segment, wherein the churn value is associated with transaction characteristics associated with the customers corresponding to the data in each segment; and predict a CLV for the customer based on an expected lifetime period of the customer, wherein the CLV is predicted by:

computing the expected lifetime period for the customer of a segment based on the churn value, wherein the expected lifetime period corresponds to a time period for which the customer is expected to perform transactions with an organization;

performing a comparison of the expected lifetime period with a threshold and determine the segments that include customers with the expected lifetime period greater than the threshold and the segments that include customers with the expected lifetime period lesser than the threshold; and estimating the CLV for each customer of each segment based on whether the customer has the expected lifetime period greater than the threshold, wherein for the customer with the expected lifetime period lesser than the threshold, a first computation technique leveraging a calculated margin value, an interest rate for discounted cash flow is used to predict the CLV, wherein for the customer with the expected lifetime period greater than the threshold, a second computation technique leveraging a calculated margin, a retention rate and an interest rate for discounted cash flow is used to predict the CLV, wherein the CLV is indicative of association of the customers with the organization corresponding to each segment.

12. The non-transitory computer-readable medium as claimed in claim 11, wherein the instructions for predicting CLV are further configured to:

apply data cleansing on the dataset to eliminate at least one of incomplete data and corrupted data; and analyze the dataset based on the Recency Frequency and Margin (RFM) to generate the weighted RFM scores.

* * * * *